United States Patent [19]

Kapellner

[11] 4,432,588
[45] Feb. 21, 1984

[54] BEARING TO BE USED FOR A ROTATING BODY

[75] Inventor: Arnold Kapellner, Linz, Austria

[73] Assignee: Voest-Alpine Aktiengesellschaft, Linz, Austria

[21] Appl. No.: 320,655

[22] Filed: Nov. 12, 1981

[30] Foreign Application Priority Data

Dec. 15, 1980 [AT] Austria .................................. 6083/80

[51] Int. Cl.[3] ...................... F16C 19/02; F16C 19/50; F16C 35/00; F16C 13/06
[52] U.S. Cl. ..................................... 308/234; 308/178; 308/190; 308/203; 308/227
[58] Field of Search ................. 308/20, 190, 194, 173, 308/176, 178, 189 R, 203, 208, 207 R, 232, 224, 229, 35, 25, 15, 227, 228, 234

[56] References Cited

U.S. PATENT DOCUMENTS

| 889,043 | 5/1908 | Preacher | 308/234 |
|---|---|---|---|
| 1,462,379 | 7/1923 | Rennerfelt | 308/234 |

FOREIGN PATENT DOCUMENTS

| 68620 | 5/1915 | Austria . | |
|---|---|---|---|
| 74248 | 2/1917 | Austria | 308/228 |
| 241920 | 8/1965 | Austria . | |
| 1285972 | 1/1969 | Fed. Rep. of Germany . | |
| 7029964 | 12/1970 | Fed. Rep. of Germany . | |
| 2256389 | 7/1973 | Fed. Rep. of Germany . | |
| 459886 | 12/1949 | Italy | 308/227 |
| 1196148 | 6/1970 | United Kingdom . | |

Primary Examiner—Stuart S. Levy
Assistant Examiner—Thomas R. Hannon
Attorney, Agent, or Firm—Brumbaugh, Graves, Donohue & Raymond

[57] ABSTRACT

In a thrust bearing for a rotating body, rolling bodies are journaled on a bearing body, supporting a rotation surface of the rotating body in the direction of its rotation axis. In order to reach a reliable support of the rotating body on all of the rolling bodies, even in case of oscillations of the rotating body, or in case of an uneven wear of the rotation surface of the rotating body, or in case of unequal diameters of the rolling bodies, the bearing body is journaled so as to be pivotable about a pivot axis. The pivot encloses an angle with the rotation axis of the rotating body.

3 Claims, 5 Drawing Figures

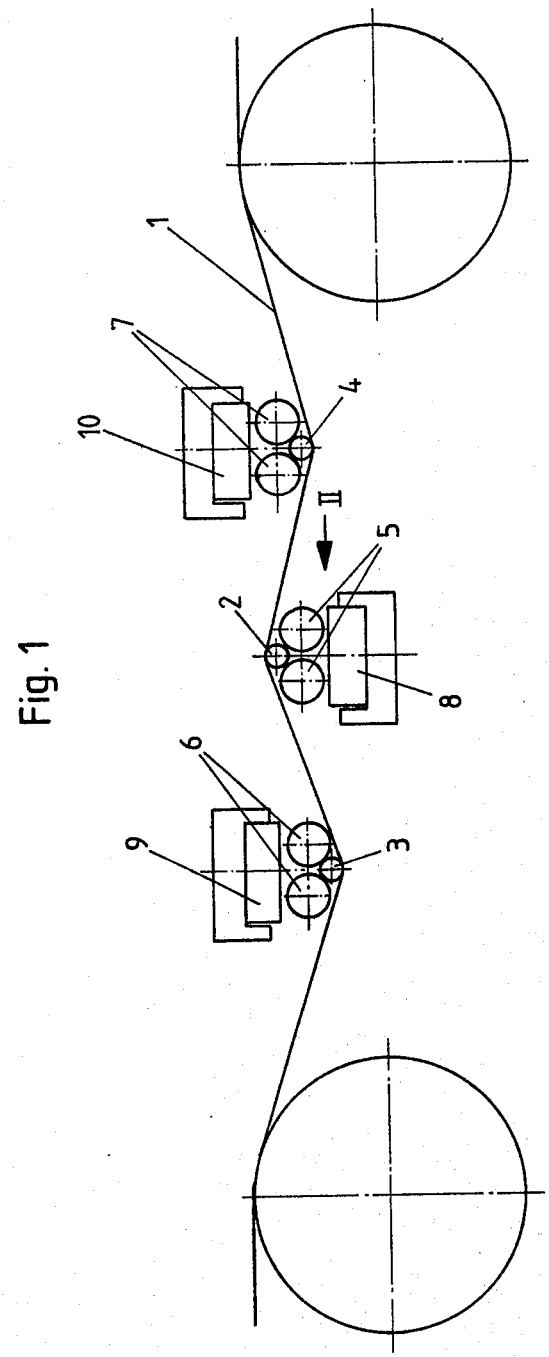

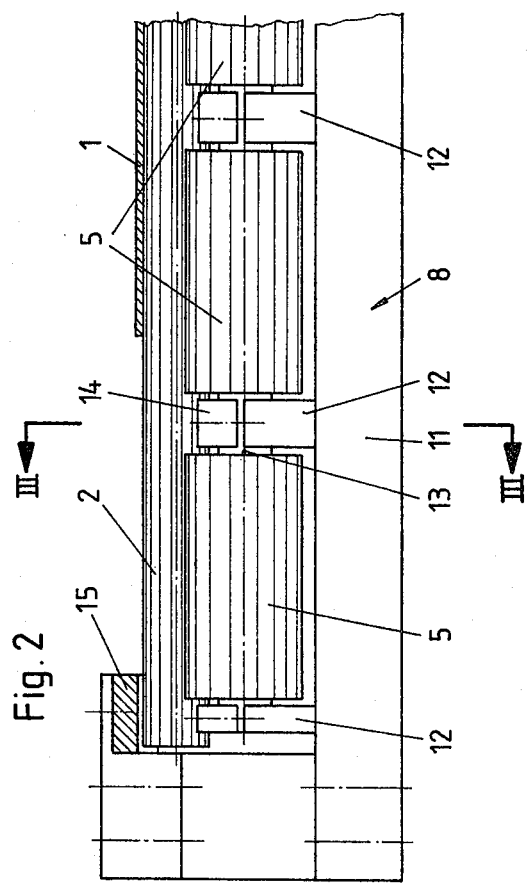
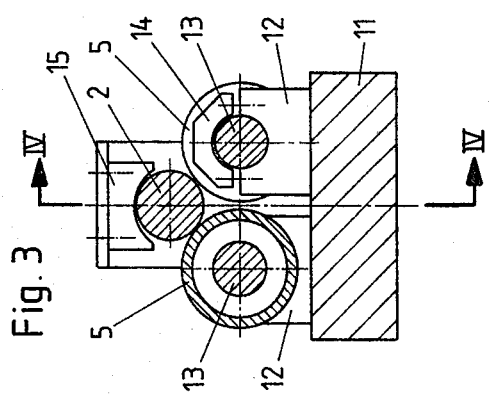

3,432,588

BEARING TO BE USED FOR A ROTATING BODY

BACKGROUND OF THE INVENTION

The invention relates to a bearing for a rotating body, such as a roller, an axle or a shaft, comprising rolling bodies journaled on a bearing body and supporting a rotation surface of the rotating body in the direction of its rotation axis.

A thrust bearing is known from Austrian Pat. No. 74,248. With this thrust bearing, a rotating spindle with a plane face is supported on two rollers. These rollers are journaled on a common axle that intersects the rotation axis of the spindle at a right angle and is held in a rigid fork.

With a thrust bearing of this kind, it is advantageous that the spindle, when sagging (for instance, when running at the critical number of revolutions), runs only on one of the two rollers. Also with an uneven wear of the two rollers, or the plane face running on the rollers, the spindle runs on one roller only. Thereby a centric accommodation of the axial forces is no longer possible, which adversely affects the quiet running of the spindle. In addition, the radial bearings of the spindle are worn to an increased extent in case of an eccentric accomodation of the axial forces.

A further thrust bearing of the initially defined kind is known from Austrian Pat. No. 241,920 for the axial journaling of a drum type furnace. This drum type furnace is supported on four supporting rollers in the axial direction via a side face of a circumferential collar. Two of these supporting rollers are each journaled in a rocker arm, which leans against a soft or resilient member, such as e.g. a spring, and preferably against a hydraulic hoist that is in connection with a biased oil pneumatic accumulator. A distribution of the total load onto the various rocker arms may thereby be achieved. The means necessary for realizing this distribution of the total load are complex and expensive to maintain. Moreover, these soft and resilient members have to be accurately adjusted, which is very difficult to achieve in practice.

SUMMARY OF THE INVENTION

The invention aims at avoiding these disadvantages and difficulties, and has as its object to provide a bearing, in which axial forces are reliably and automatically transmitted to all of the provided rolling bodies without requiring any adjustment work, even in case of oscillations of the rotating body, or an uneven wear of the rotation surface of the rotating body or with unequal diameters of the rolling bodies, and wherein the structure of the axial bearing is to be as simple as possible.

This object is achieved according to the invention in that the bearing body is journaled so as to be pivotable about a pivot axis, the pivot axis enclosing an angle with the rotation axis of the rotating body, preferably an angle of about 90°.

A preferred embodiment is characterized in that two rolling bodies are journaled in the bearing body, which are arranged diametrically opposite each other with respect to the rotation axis of the rotating body and are in alignment with their axes, and that the bearing body is pivotable about a single pivot axis directed normal to the axes of the rolling bodies, the pivot axis suitably being located on the bearing body in the middle between the rolling bodies.

Advantageously, radial antifriction bearings are provided as rolling bodies.

The bearing according to the invention is to be used with a special advantage in particular for the journaling of a stretch roll in a stretcher leveler.

BRIEF DESCRIPTION OF THE DRAWINGS

The invention will now be explained in more detail with reference to the accompanying drawings, wherein:

FIG. 1 is a side view of a stretcher leveler in a schematic illustration;

FIG. 2 shows a detail of FIG. 1, viewed along arrow II;

FIG. 3 is a section along line III—III of FIG. 2;

DESCRIPTION OF EXEMPLARY EMBODIMENT

Figure 4:
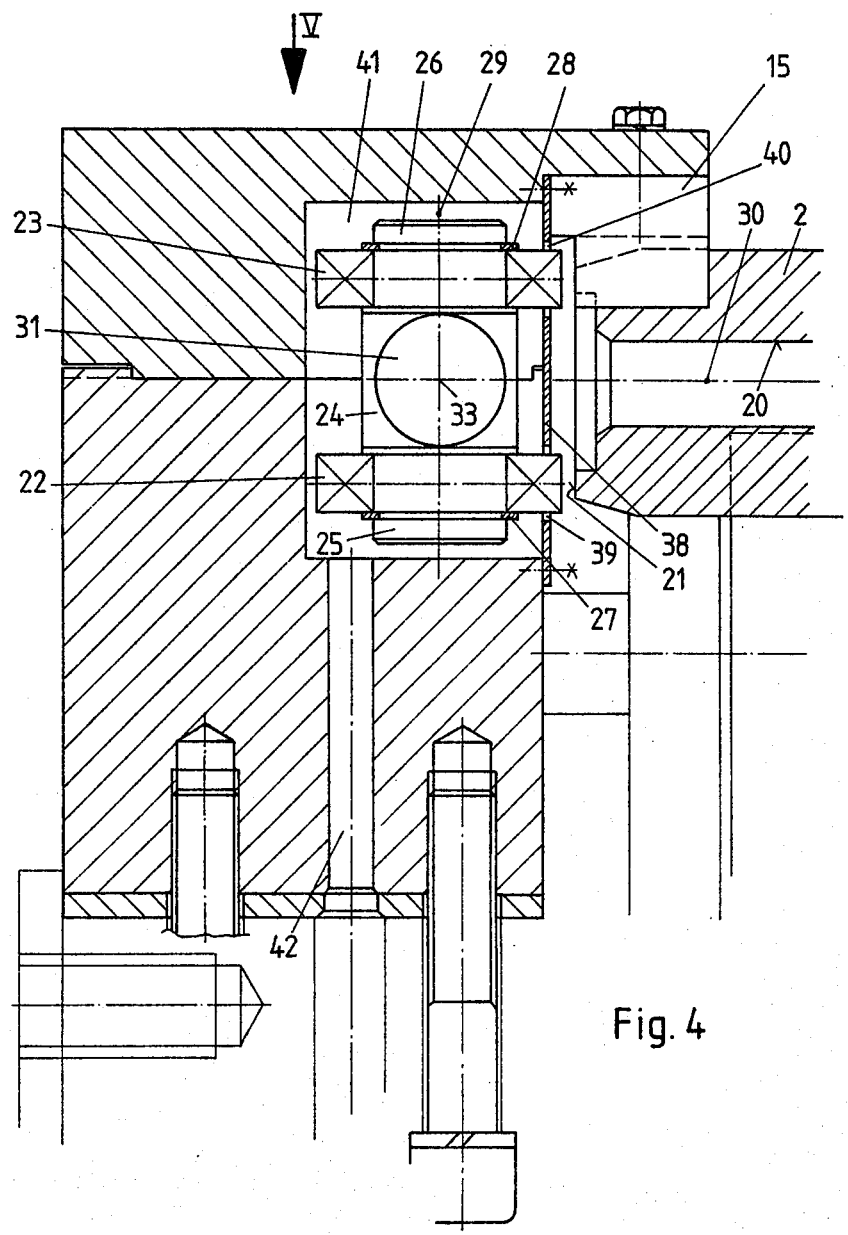
FIG. 4 illustrates the journaling of the work roll in a section laid along line IV—IV of FIG. 3.

By the stretcher leveler illustrated in FIG. 1, a steel strip 1 is stretch-leveled. The stretch rollers 2, 3 and 4 have a relatively small diameter. In order to prevent a sagging of the stretch rollers, the stretch rollers are each supported by two multiply journaled supporting rolls 5, 6, 7. The stretch rollers, which are in contact with the strip to be stretch-leveled, are pressed against the supporting rolls 5, 6, 7 by the forces acting from the strip onto them.

Each stretch roller forms a structural unit with its pertaining supporting rolls, each unit being held in an exchangeable cassette 8, 9, 10.

FIGS. 2 and 3 show details of the exchangeable cassettes by way of cassette 8. Cassette 8 comprises a carrier 11 to which bearing blocks 12 for holding axles 13 for the supporting rolls 5 are fastened. The axles 13 are fastened to the bearing blocks 12 by the aid of bearing caps 14.

The stretch roller 2 is supported on the supporting rolls 5 over almost its total length so that a bending of the stretch roller 2 by the forces acting from the strip 1 onto them is not possible.

In order to prevent the stretch roller 2 from falling out of its bearing place on the supporting rolls 5 in case the stretch roller 2 is no longer pressed against the supporting rolls 5 by the strip 1, a further bearing block 15 is provided, which embraces the stretch roller 2 on the side facing away from the supporting rolls 5. Between the stretch roller 2 and the bearing block 15, an air gap of, for instance, 2 mm is provided.

Figure 5:
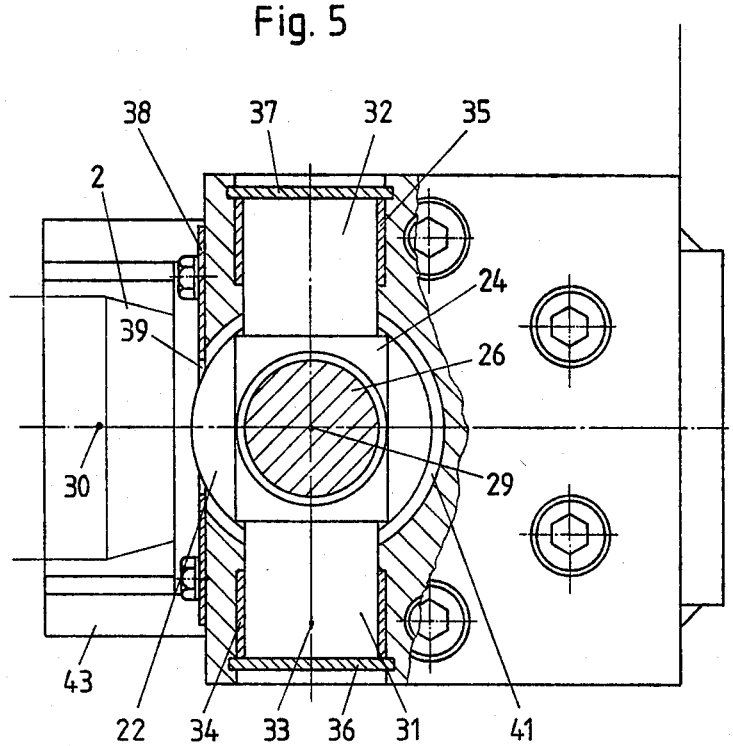
FIG. 5 is a partially sectioned view in the direction of the arrow V of FIG. 4.

FIGS. 4 and 5 illustrate the axial journaling of the stretch roller 2 according to the invention. The stretch roller 2 has a pocket bore 20 in order to achieve an annular plane face 21, via which the stretch roller 2 leans against two roller bodies 22 and 23. The roller bodies 22 and 23 are formed by commonly available radial ball bearings. The ball bearings 22 and 23 are held at pin-like projections 25 and 26 of a cuboid-shaped bearing body 24 with the help of resilient races 27 and 28. The common axis 29 of the two pin-like trunnions 25 and 26 runs normal to the rotation axis 30 of the stretch roller 2.

The cuboid-shaped bearing body 24 carries two further pin-shaped trunnions 31 and 32, whose common axis 33 is normal to both the rotation axis 30 and the common axis 29 of the two pin-like trunnions 25 and 26. The trunnions 31 and 32 are mounted in bearing bushes 34 and 35 so as to be pivotable about the axis 33. Bearing caps 36 and 37 close the bearing bushes towards outside.

In order to prevent the penetration of dirt into the thrust bearing, the latter is closed by a plate 38, which is arranged parallel to the plane face 21. The plate 38 comprises two recesses 39 and 40, through which a small section of the outer races of the ball bearings 22 and 23 project.

In order to prevent dirt from entering through openings 39 and 40 into chamber 41, in which the essential parts of the thrust bearing are accommodated, a fluid, for instance compressed air, is pumped into the chamber 41 through a bore 42, which fluid leaves the chamber through openings 39 and 40, thus flushing away any impurities.

The hardened and ground plane face 21 always contacts the two outer races of the ball bearings 22 and 23 when axial forces occur, even if this plane face is not exactly at a right angle to the rotation axis 30 of the stretch roller. Stretch rollers are subject to uneven wear so that they will sag despite their support on the supporting rolls. In this case, the plane face 21 of a stretch roller also performs a wobbling movement, which is automatically balanced out by the thrust bearing according to the invention, without requiring any additional device.

The invention is not limited to the embodiment illustrated in the Figures, but may be modified in various aspects. The axis 33, about which the bearing body 24 is pivotably mounted, need not necessarily be normal to the rotation axis 30 of the stretch roller, and may alternatively enclose an acute angle of, for instance, 45° with this axis. The right angle between the axis 33 of the bearing body and the rotation axis 30 of the stretch roller has, however, proved particularly advantageous.

Furthermore, it is possible to provide more than two rolling bodies in a thrust bearing. The bearing body accommodating the rolling bodies in this case is stationarily supported either by means of a cardan joint or a universal joint, or by means of a ball joint movable in all directions, the ball joint being arranged in the center, which means exactly in the point of intersection of the axes of the rolling bodies. Suitably, all of the rolling bodies are journaled in a single bearing body.

What I claim is:

1. A bearing to be used for a rotating body having a rotation surface and a rotation axis, said bearing comprising:
   a bearing body having two pairs of opposed pinlike projections extending outwardly therefrom, the axes of all of said projections lying in a common plane, the projections of each of said pairs having a common axis approximately normal to the axis of the other pair, the plane of said axes of said pairs of projections being approximately normal to the axis of said rotating body,
   said bearing body being adapted to pivot about the axis of one of said pairs of projections, and
   two rolling bodies journaled respectively on the projections of the other of said pairs for rotation about the axis thereof,
   said rolling bodies being arranged symmetrically relative to the rotation axis of said rotating body for supporting said rotation surface in the direction of the rotation axis of said rotating body.

2. The bearing according to claim 1, wherein said pivot axis is arranged on the bearing body midway between said rolling bodies.

3. The bearing according to claims 1 or 2, wherein said rolling bodies comprise radial antifriction bearings.

* * * * *